United States Patent [19]

Taig

[11] Patent Number: 5,273,137
[45] Date of Patent: Dec. 28, 1993

[54] CALIPER SUPPORT KEY

[75] Inventor: Alistair G. Taig, Edwardsburg, Mich.

[73] Assignee: Allied-Signal Inc., Morristown, N.J.

[21] Appl. No.: 944,609

[22] Filed: Sep. 14, 1992

[51] Int. Cl.⁵ ............................................. F16D 65/02
[52] U.S. Cl. ............................ 188/73.35; 188/73.43; 188/73.45
[58] Field of Search ............... 188/73.35, 73.36, 73.43, 188/73.44, 73.45, 379; 267/35, 116, 119, 136, 139, 140, 140.11, 140.13

[56] References Cited

U.S. PATENT DOCUMENTS

| | | | |
|---|---|---|---|
| 1,975,145 | 9/1932 | Geyer | 267/140.13 |
| 3,625,314 | 6/1969 | Rinker | 188/73.43 |
| 3,831,717 | 8/1974 | Flaherty | 188/73.35 |
| 4,141,436 | 2/1979 | Meyer | 188/73.45 |
| 4,355,791 | 10/1982 | Dean | 267/136 |
| 4,560,039 | 12/1985 | Bolenbaugh et al. | 188/73.35 |
| 4,793,448 | 12/1988 | Bolenbaugh et al. | 188/73.35 |

Primary Examiner—Robert J. Oberleitner
Assistant Examiner—Chris Schwartz
Attorney, Agent, or Firm—Larry J. Palguta; Ken C. Decker

[57] ABSTRACT

The caliper support key (40) provides a low spring load/high damping support for a caliper (12) mounted on a support member (14). The caliper (12) includes at each circumferential side a recess (20) which may receive a protrusion (16, 18) from the support member (14). At one side of the caliper (12), the support key (40) is located between the protrusion (16) and recess (20). The support key (40) comprises a generally H-shaped key support member (40) receiving at one side thereof the protrusion (16) and the other side a stepped opening (49) defining portions of a first (50) and a second (52) cavity. A plunger (60) of the caliper support key (40) engages a surface (21) of the recess (20) in the caliper (12) and extends through the first cavity (50) and into the second cavity (52) with a small clearance (72) therebetween. A composite sealing ring (75) is disposed about the plunger (60) and engages the surface of the first cavity (50). A resilient spring (73) is located between the sealing ring (75) and a pair of flanges (64, 66) of the plunger (60) in order to bias the sealing ring (75) inwardly of the stepped opening (49). A fluid (79) is located within the stepped opening (49) of the caliper support key member (40) to provide a return, high damping force against said plunger (60).

17 Claims, 2 Drawing Sheets

CALIPER SUPPORT KEY

The present invention relates generally to a caliper support key for a disc brake, and in particular to a support key that provides low spring loading/high damping.

Disc brakes utilize various mechanisms to support the caliper relative to the support member, often with spring mechanisms permitting some circumferential movement of the caliper relative to the support member. The caliper may be coupled with the support member by utilizing a separate cold formed key and leaf type of caliper support spring. This type of key and spring can result in wear of the support member, the associated caliper surface which engages the key, the key and the spring, and all of this resulting in a caliper that is loosely positioned on the support member. An improved caliper support key is disclosed in Bolenbaugh et al U.S. Pat. No. 4,793,448. For calipers which utilize rail sliding between the brake caliper and the support member, there is typically utilized the spring-loaded mounting key to take up any clearance between the V-grooves in the caliper and the rails of the anchor bracket. The key also facilitates mounting and removal of the caliper. In order to limit damage to the mountings and noise due to vibration, the spring which loads the caliper against the rails must exert a force considerably greater than the caliper weight. The common results of this heavy spring load are excessive wear on the slide grooves and high friction, which can cause dragging of the outer brake shoe against the rotor. It is highly desirable to provide a caliper mounting key which utilizes low spring loading and high damping. The caliper mounting key should provide reduced friction between the key and the caliper, thereby reducing the tendency to drag the outer brake shoe on the rotor. Also, the tendency of the mounting key to deflect under dynamic conditions should be greatly reduced and thereby minimize noise and damage. Additionally, the mounting key should enable a heavy caliper to be mounted on the same support member as a lighter caliper, without requiring any modifications of the V-rails or anchor brackets of the support member.

The present invention provides solutions to the above problems by providing a caliper support key in a disc brake having a caliper supported by a support member, the support member having one of a recess and a protrusion and the caliper having the other of the recess and protrusion, the caliper support key comprising a support key member that engages the protrusion and which includes therein a stepped opening, the stepped opening comprising a first cavity extending into said support key member and a second cavity communicating with the first cavity, a plunger engaging a surface of said recess and extending into said stepped opening such that the plunger extends through said first cavity and into said second cavity, sealing means disposed about said plunger and engaging a surface of said first cavity, a fluid contained in the stepped opening by the sealing means and plunger, and resilient means located between said sealing means and said plunger, so that the caliper support key supports said caliper for sliding movement relative to said support member and provides damping for movement of the caliper relative to the support member.

One way of carrying out the invention is described in detail below with reference to the drawings which illustrate an embodiment in which.

Figure 1:
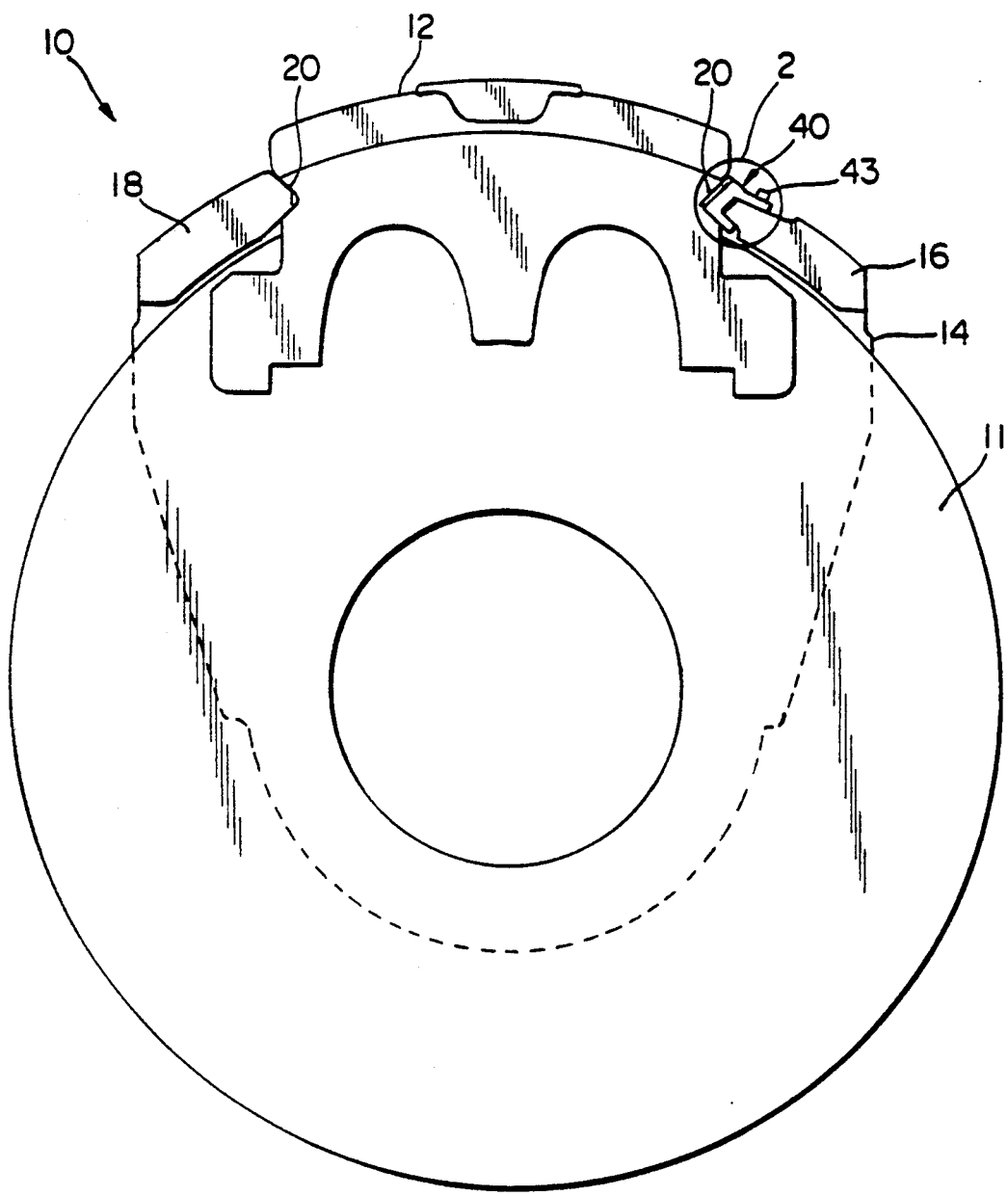
FIG. 1 is a view of a disc brake caliper mounted on a support member adjacent a rotor.
Figure 2:
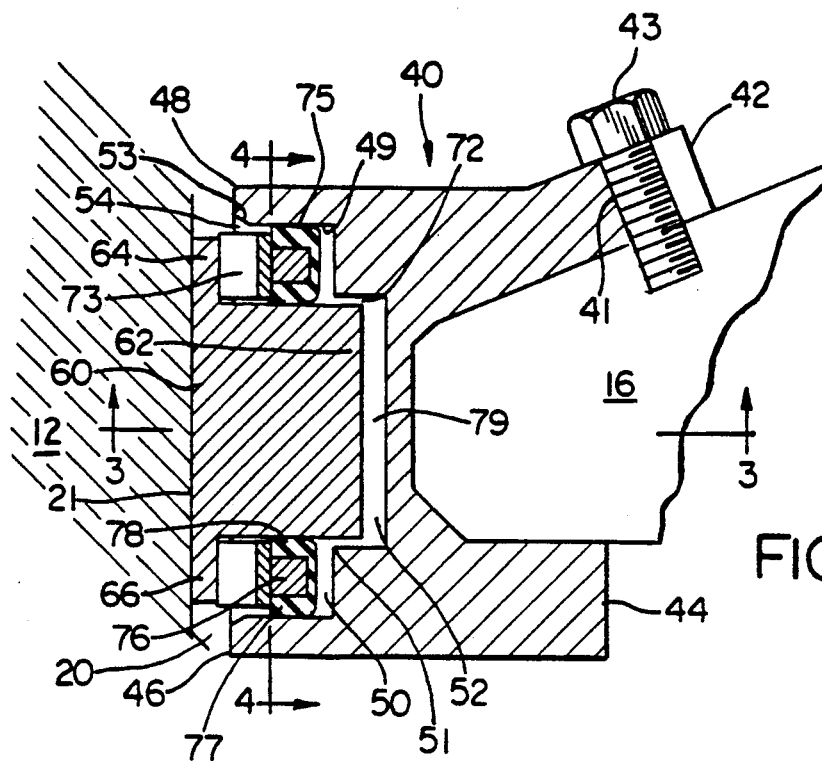
FIG. 2 is an enlarged section view of the circled portion of FIG. 1.
Figure 3:
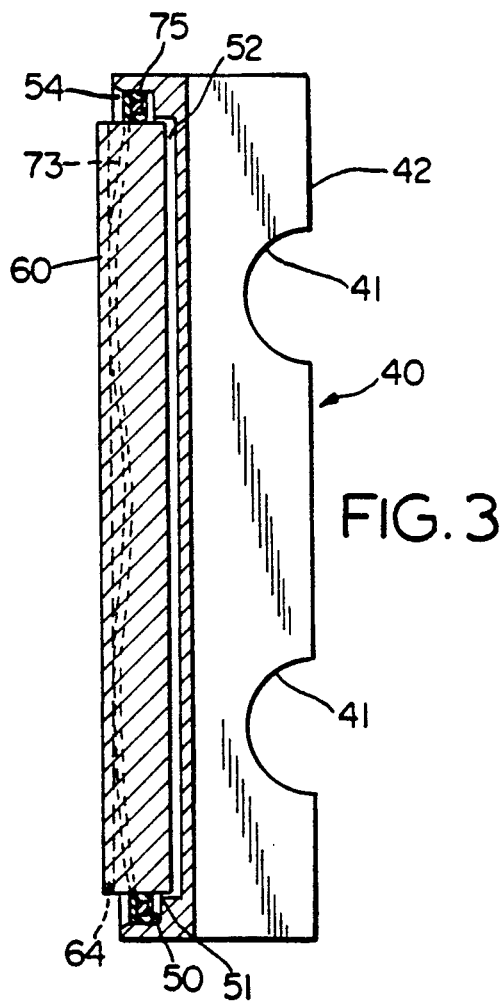
FIG. 3 is a section view taken along view line 3—3 of FIG. 2.
Figure 4:
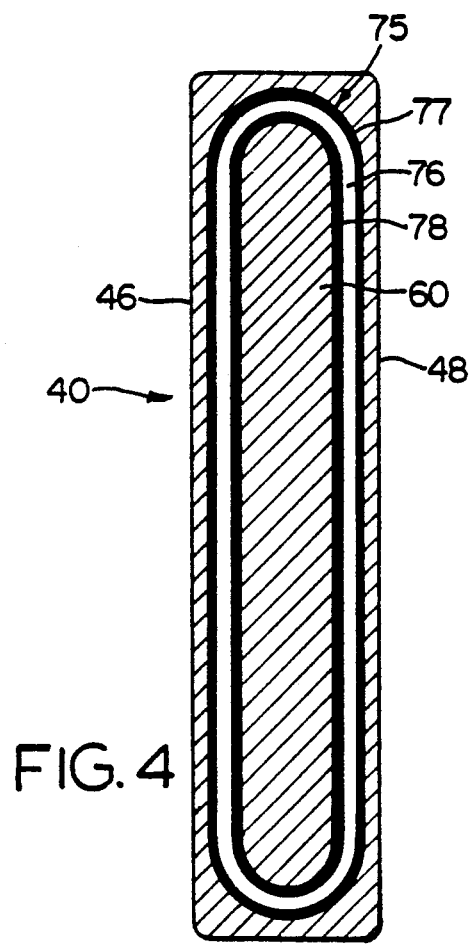
FIG. 4 is a section view taken along view line 4—4 of FIG. 2.

Referring to FIG. 1, a disc brake is designated generally by reference numeral 10 and comprises a caliper 12 mounted slidingly upon support member 14 which includes support brackets or protrusions 16 and 18. Rotor 11 is located next to support member 14. Caliper 12 includes a pair of oppositely disposed V-shaped rail recesses or grooves 20 which receive, at one side, support bracket 18 and at the other side caliper support key 40. Caliper support key 40 is mounted by bolts 43 upon the end of bracket 16. Referring to FIG. 2, caliper support key 40 comprises a generally H-shaped member having a pair of anchor bracket side legs 42 and 44 and a pair of oppositely disposed recess side legs 46 and 48. Leg 42 extends circumferentially beyond leg 44 and at an angle relative to leg 44 and has openings 41 for bolts 43. Leg 42 follows the outer shape of support bracket 16. Legs 46 and 48 define the perimeter of support key stepped opening 49 which comprises first cavity 50 and second cavity 52 divided by stepped shoulder 51. Stepped opening 49 also includes beveled surface 53 adjacent end opening 54. T-shaped plunger 60 extends through first cavity 50 and into second cavity 52. Plunger 60 engages surface 21 of recess 20 located on caliper 12. Bottom leg 62 of plunger 60 has a smaller dimension than the dimension of second cavity 52 so that a small clearance 72 is defined therebetween. Plunger 60 includes top T-member flanges 64 and 66 which engage wave spring 73. The wave spring extends from flanges 66 and 64 to engage sealing ring 75. Sealing ring 75 is a long oval shaped composite sealing ring containing central metal portion 76 and peripheral elastomeric portions 77 and 78. Sealing ring 75 slidingly and sealingly engages the surface of first cavity 50. Located within cavities 50 and 52 is a silicone fluid 79 such as dimethyl silicone-60,000 C.S.

Wave spring 73 biases sealing ring 75 which causes the silicone fluid within first and second cavities 50 and 52 to be pressurized, thus forcing plunger 60 into engagement with surface 21 of recess 20. Under dynamic conditions, when caliper 12 tends to move on anchor brackets 16 and 18 due to shock loading on the vehicle axle, key 40 is heavily damped to resist motion. The damping results from two phenomenon. First, in order to move plunger 60, silicone fluid must be forced through clearance 72 which exists between first and second cavities 50, 52. As silicon fluid exits second cavity 52, passes through clearance 72 and enters first cavity 50, wave spring 73 is compressed between plunger 60 and sealing ring 75 as the volume of fluid in the first cavity 50 increases. Second, the silicone fluid has a property which causes it to stiffen under impact loading, therefore becoming momentarily highly viscous.

The caliper support key of the present invention provides substantial advantages over prior support mechanisms. First, the caliper support key utilizes a low spring load and high damping. The low spring loading results in reduced friction between the mounting key and the caliper, and this reduces the tendency to drag the outer brake shoe on the rotor. The tendency of the support key to deflect under dynamic conditions is greatly reduced, and this minimizes noise and damage. Additionally, the key enables a heavy caliper to be mounted on the same anchor brackets as a lighter caliper, all without requiring any modifications of the V-rails 20 or the anchor brackets 16, 18.

I claim:

1. A caliper support key in a disc brake having a caliper supported by a support member, the support member having one of a recess and a protrusion and the caliper having the other of the recess and protrusion, the caliper support key comprising a support key member that engages the protrusion and which includes therein a stepped opening, the stepped opening comprising a first cavity extending into said support key member and a second cavity communicating with the first cavity, a plunger engaging a surface of said recess and extending into said stepped opening such that the plunger extends through said first cavity and into said second cavity, sealing means disposed about said plunger and engaging a surface of said first cavity, a fluid contained in the stepped opening by the sealing means and plunger, and resilient means located between said sealing means and said plunger, so that the caliper support key supports said caliper for sliding movement relative to said support member and provides damping for movement of the caliper relative to the support member.

2. The caliper support key in accordance with claim 1, wherein the second cavity has a larger dimension than a dimension of said plunger so that a small clearance is defined therebetween, such that fluid in said cavities must pass through said small clearance in order to flow between said cavities.

3. The caliper support key in accordance with claim 2, wherein said sealing means comprises a composite of a metal material and an elastomeric material.

4. The caliper support key in accordance with claim 1, wherein said resilient means comprises a wave spring.

5. The caliper support key in accordance with claim 1, wherein said plunger is generally T-shaped with a single bottom leg of the T extending into said first and second cavities.

6. The caliper support key in accordance with claim 5, wherein each of said cavities is generally rectangular shaped with a shoulder therebetween.

7. The caliper support key in accordance with claim 6, wherein said second cavity is smaller than said first cavity.

8. The caliper support key in accordance with claim 7, wherein the protrusion is disposed at said support member and the recess disposed at said caliper.

9. A caliper support key in a disc brake having a caliper supported by a support member, the support member having one of a recess and a protrusion and the caliper having the other of the recess and protrusion, the caliper support key comprising a generally H-shaped support key member that engages on one side of the protrusion and which includes on the other side a stepped opening, the stepped opening comprising a first cavity extending into said support key member and a second cavity communicating with the first cavity, a T-shaped plunger engaging a surface of said recess and extending into said stepped opening such that the plunger extends through said first cavity and into said second cavity, sealing means disposed about said plunger and engaging a surface of said first cavity, a fluid contained in the stepped opening by the sealing means and plunger, and resilient means located between said sealing means and said plunger, so that the caliper support key supports said caliper for sliding movement relative to said support member and provides damping for movement of the caliper relative to the support member.

10. The caliper support key in accordance with claim 9, wherein the second cavity has a larger dimension than a dimension of said plunger so that a small clearance is defined therebetween, such that fluid in said cavities must pass through said small clearance in order to flow between said cavities.

11. The caliper support key in accordance with claim 9, wherein said sealing means comprises a composite of a metal material and an elastomeric material.

12. The caliper support key in accordance with claim 9, wherein said resilient means comprises a wave spring.

13. The caliper support key in accordance with claim 9, wherein said plunger includes a single bottom leg extending into said first and second cavities.

14. The caliper support key in accordance with claim 9, wherein each of said cavities is generally rectangular shaped with a shoulder therebetween.

15. The caliper support key in accordance with claim 9, wherein said second cavity is smaller than said first cavity.

16. The caliper support key in accordance with claim 9, wherein the protrusion is disposed at said support member and the recess disposed at said caliper.

17. The caliper support key in accordance with claim 16, wherein the one side of the support key member includes a pair of legs engaging the protrusion and one leg having an end located at an angle relative to the other leg.

* * * * *